Aug. 19, 1969　　　F. E. FINNEY　　　3,461,937
BASKET NUT ASSEMBLY WITH LATCHING RETENTION OF REMOVABLE NUT
Filed May 15, 1967　　　2 Sheets-Sheet 1

INVENTOR.
FRANK E. FINNEY
BY
Lynn H Latta
-ATTORNEY-

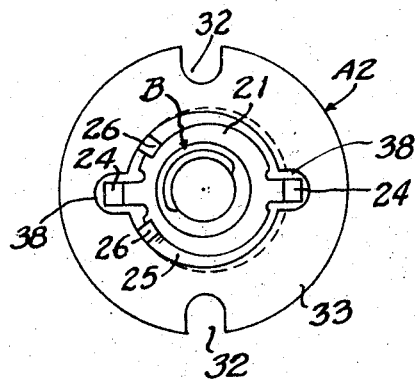
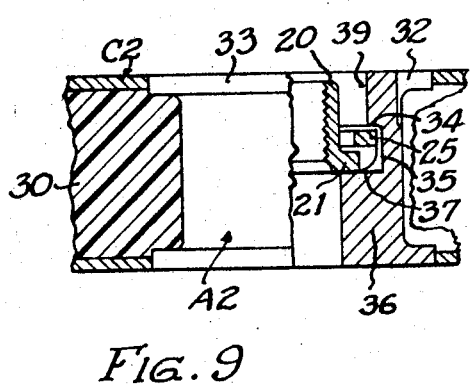
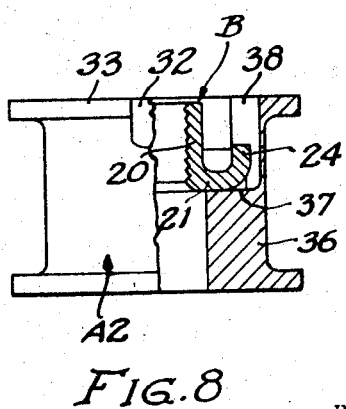

United States Patent Office 3,461,937
Patented Aug. 19, 1969

3,461,937
BASKET NUT ASSEMBLY WITH LATCHING RETENTION OF REMOVABLE NUT
Frank E. Finney, Garden Grove, Calif., assignor to Shur-Lok Corporation, Santa Ana, Calif., a corporation of California
Filed May 15, 1967, Ser. No. 638,390
Int. Cl. F16b 39/10, 37/04, 29/00
U.S. Cl. 151—41.75                    9 Claims

ABSTRACT OF THE DISCLOSURE

A combination of retainer basket with flanged retainer rim, with a nut having an annular base normally retained within a collar portion of the basket by a rim flange on the collar, overhanging the base, the base being removable by releasing latch means which normally locks it in the basket.

BACKGROUND OF INVENTION

Sheet metal nuts embodying an internally threaded sleeve drawn from a flange-like base are well known and commonly used in industry. In some instances the nut flange is designed to be welded or riveted directly to a work sheet. Such a nut is disclosed in Todd Patent No. 2,286,982 and in Huntoon Patent No. 2,385,991. A sheet metal nut having a generally circular base flange provided with diametrically opposed fingers to lock it against rotation in an aperture in a work sheet is disclosed in Burke Patent No. 2,233,242. A nut having a base that is retained in a cradle by removable retainer pins is disclosed in Phelan Patent No. 3,205,927.

In Rohe Patent No. 3,019,865, a nut with radially projecting base ears is confined within a cylindrical housing having recesses to receive the ears. The parts are not of sheet metal, nor is the nut releasably latched in the housing.

Summers Patents No. 2,381,233 discloses a floating nut latched into a retainer channel.

SUMMARY OF INVENTION

The invention is particularly characterized in that the nut base, formed integrally with the nut of stamped sheet metal, has a periphery defined by a pair of diametrically opposed arcuate spring tails terminating in finger grips that can be squeezed together to reduce the diameter of the tails sufficiently to release the nut base through the aperture defined by the rim flange of the retainer basket; and between the ends of the tails, the nut base has a pair of diametrically opposed fingers engaged in slots in the retainer basket, so as to hold the nut against rotation in the basket.

The object of the invention is to provide a relatively inexpensive nut and retainer basket assembly of stamped sheet metal construction, including a retainer basket in the form of a flanged circular collar and a nut having a flanged base which is correspondingly of substantially circular form, normally retained securely within the basket by spring latching means which is easily unlatched for removal of the nut.

A further object is to provide for limited floating, self-aligning movement of the nut in the retainer basket.

These and other objects will become apparent in the following specification, in connection with the appended drawing, wherein:

FIG. 7 is a plan view of a potted-in panel insert embodying the invention;

FIG. 8 is a front view thereof, in half section; and

FIG. 9 is a side view thereof, in half section.

Figure 5:
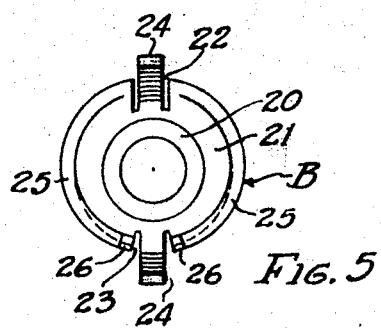
FIG. 5 is a plan view of the completed nut.

Referring now to the drawing in detail, I have shown therein, as an example of one form in which the invention may be embodied, a basket nut comprising, in general, a retainer basket A and a nut B adapted to be releasably held within the basket A with limited freedom of shifting movement therein for self-alignment with a bolt projected through an aperture in a work body C to which the basket A may be attached. Nut B and basket A are both fabricated of stamped sheet metal (e.g., stainless steel).

Basket A comprises a mounting flange 10 for attachment (e.g., by welding) to a work body C, in coaxial relation to a bolt aperture 11 therein; a cylindrical retainer collar 12 drawn axially from flange 10; and a retainer lip 13 of narrow radial width, projecting inwardly from the rim of collar 12 and defining a circular opening 15. Diametrically opposed retainer notches 14 are provided in basket A, extending through lip 13 and into collar 12 to a depth just short of mounting flange 10.

Nut B comprises an internally threaded sleeve 20 drawn from a base flange 21 which is cylindrical except for diametrically opposed notches 22 and 23 (FIG. 5) from which project respective rotation-restraining dogs 24, formed integrally therewith and projecting outwardly at a dihedral angle, on the same side of base flange 21 as sleeve 20. In the assembly, dogs 24 are loosely received in basket notches 14.

A pair of latch arms 25 is formed integrally with base flange 21 on opposite sides of notch 22, and extend arcuately along respective side margins of base flange 21 to points adjacent notch 23, where they are bent upwardly to provide a pair of finger grips 26 which can be squeezed between an operator's fingers so as to draw the arms 25 inwardly sufficiently to clear the inner margin of retainer lip 13, thus making it possible to remove the nut B from basket A. Arms 25 are displaced upwardly sufficiently to lie above the base flange 21, and they are displaced radially inwardly so as to overlap the marginal face areas of the flange at their free ends as best shown in FIG. 5.

Figure 3:
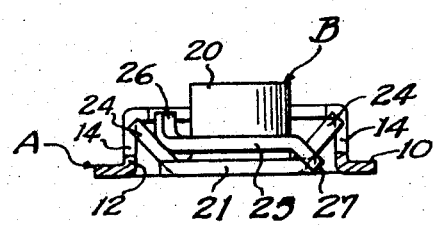
FIG. 3 is a sectional view taken on line 3—3 of FIG. 1.
Figure 2:
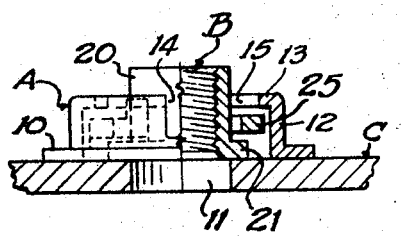
FIG. 2 is a side elevational view of the same, partially in axial section, taken on line 2—2 of FIG. 1.

Arms 25 are joined to base flange 21 by narrow axially offset webs 27 (FIGS. 3 and 4) on either side of notch 22 having an axial offset at least equal to the thickness of flange 21, so that the arms 25 may lie above the flange 21 for substantially their full (circumferential) length. The radius of curvature of the outer margins of arms 25 is substantially the same as that of the periphery of base flange 21, and thus when they are sprung inwardly their outer margins will tend to register with the periphery of base flange 21, which is somewhat smaller diameter than the inner margin of retainer lip 13, so that the nut base can then pass readily through the opening 15 defined within lip 13. When the arms 25 are allowed to spring outwardly to their normal positions (FIG. 2) they project beneath the lip 13 so as to securely retain the nut B against escape from basket A, while allowing limited axial and radial movements of the nut within the basket for self-alignment with reference to a bolt projected through aperture 11 and threaded into the nut. With nut base 21 seated on the face of work C, the retainer arms 25 will be adjacent lip 13 with some axial clearance, as indicated in FIG. 2. Dogs 24 project into notches 14 so as to interlock with retainer collar 12 to hold the nut against rotation relative to retainer basket A. The finger grips 26 project axially from base 21 into basket opening 15, in which they substantially abut the inner margin of retainer rim 13.

To release the nut from assembly in the basket, it is only necessary to reach the tips of index finger and thumb into the aperture 15 defined by lip 13 to engage the grips 26 between the fingers (which can be pressed against the inner margin of lip 13 in order to do so) and to squeeze the grips together, thus reducing the periphery of the nut base sufficiently to pass it through aperture 15. The nut is then lifted out of the basket, the grips 26 functioning as a handle for this purpose. The dogs 24 will slide axially through and out of the notches 14 to permit release of the nut from the basket.

Figure 4:
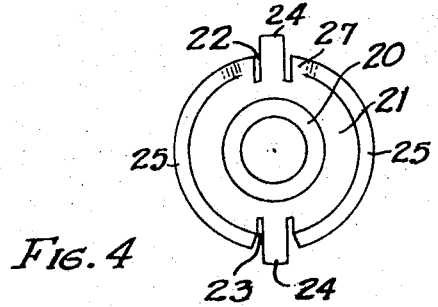
FIG. 4 is a plan view of the nut in an intermediate stage of fabrication.
Figure 1:
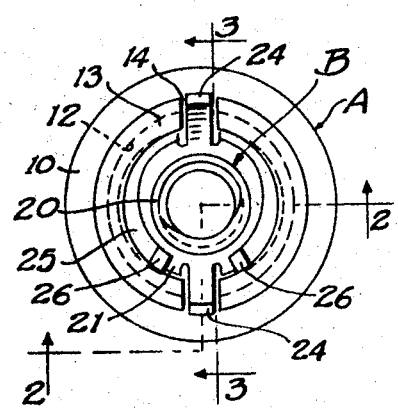
FIG. 1 is a plan view of a basket nut embodying the invention.

In fabricating the nut, the sleeve 20 is drawn from a sheet metal blank, and the base is then formed by a blanking and lancing operation or operations, first lying in a common plane with the arms 25 embracing the periphery of base flange 21, as in FIG. 4. The nut is then subjected to a forming operation in which arms 25 are first displaced upwardly, forming the offsets 27, and are then displaced radially inwardly and curled to a smaller radius. Thus in the finished nut they overlap the periphery of base 21 with an inwardly spiralling overlap, the radial extent of overlap increasing progressively from the offset webs 27 around to the finger grips 26 (FIG. 5). The grips 26 can be formed in the operation in which offset 27 is formed, or in a subsequent operation in which they are bent upwardly from the ends of the arms.

Figure 6:
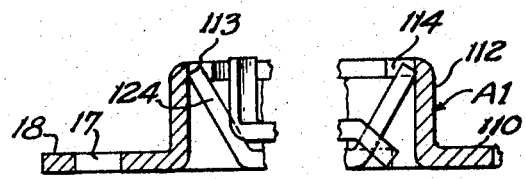
FIG. 6 is a fragmentary sectional view of a modified form of the invention.

FIG. 6 illustrates a modified construction wherein the basket A1 has notches 114 only in its rim 113, and wherein the dogs 124 of the nut base are engaged in notches 114 and do not project into collar 112 which is fully cylindrical. FIG. 14 also illustrates that flange 110 may have apertures 17 for riveting or bolting the basket A-1 to a work body instead of welding. In such a modification, the base need not be circular. Apertures 17 may be formed in ears 18 projecting radially from the flange portion of base 110.

FIGS. 7, 8 and 9 show how the invention can be embodied in a potted-in panel insert embodying a housing A2 adapted to be mounted in a panel C2 in the manner disclosed in U.S. Patent No. 3,271,498, potting material 30 being injected through a port 32 in a head 33 of the insert and hardening to provide an anchoring body around the insert and within the panel C2. Housing may be pottted into panel C2 in any other suitable manner. Nut B is essentially the same as disclosed in FIG. 5. When installed in housing A2, its latch arms 25 spring outward and project beneath an undercut annular retainer shoulder 34 defined at the top of an internal annular groove 35 in the lateral wall 36 of housing A2. The base 21 of nut B rests upon an annular shoulder 37 defining the bottom of groove 35. The nut is held against rotation by engagement of dogs 24 in grooves 38 extending parallel to the housing axis in its wall 36. A cylindrical throat 39, extending from retainer shoulder 34 through head 33, constitutes a release aperture through which the nut can be removed by squeezing the finger grips 26 together so as to draw arms 25 inwardly sufficiently to clear the retainer shoulder 34 and enter the throat 39.

I claim:
1. A basket nut assembly comprising:
a cylindrical housing having means for attaching it to a work body and having an annular circular retainer shoulder projecting inwardly and defining a release aperture;
a nut comprising an internally threaded sleeve body and a generally circular base on one end thereof received in said housing in substantially concentric relation thereto, said base including a generally circular flange projecting radially outwardly from said sleeve end and a pair of latch arms disposed in a plane adjacent to but offset axially from the plane of said flange, attached at one end integrally to one side of said flange, extending arcuately along respective sides of said flange, projecting radially outwardly beyond the periphery thereof for at least a portion of their length, normally extending beneath said shoulder and substantially conforming to the curvature thereof, and having their other ends free for inwardly retracting movements from said normal positions projecting beneath said shoulder to retain the nut in the housing, to positions in noninterfering relation to said shoulder such that said nut base can be passed through said release aperture, and means extending from said flange to prevent rotation of the nut relative to the retainer.

2. A basket nut assembly as defined in claim 1, wherein said arms are provided on their said free ends with finger grips adapted to be grasped between an operator's fingers and squeezed in order to effect said retracting movements of said arms, said finger grips projecting axially from said arms and into said release aperture for easy access thereto by the operator's fingers.

3. A basket nut assembly as defined in claim 1, wherein said arms are joined to said flange by means of axially offset integral webs.

4. A basket nut assembly as defined in claim 1, wherein said arms are in partially overlapping relation to said base flange, normally projecting radially outwardly beyond the opposite side margins thereof for a portion of their radial width, joined thereto at their one ends by integral axial offsets, and adapted to be sprung inwardly so as to draw their opposite outer side margins inwardly substantially to the periphery of said base flange.

5. A basket nut assembly as defined in claim 1, wherein said housing comprises a cylindrical collar having at one end a radially inwardly projecting lip defining said shoulder, said collar and lip having diametrically opposed notches and said base having a pair of dogs projecting into said notches to hold the nut against rotation relative to the base, and said dogs being releasable through the portions of the notches in said lip when said arms are retracted.

6. A basket nut assembly as defined in claim 1, wherein said housing comprises a cylindrical collar having at one end a radially inwardly projecting lip defining said shoulder, said collar and lip having diametrically opposed notches and said base having a pair of dogs projecting into said notches to hold the nut against rotation relative to the base, said dogs being releasable through the portions of the notches in said lip when said arms are retracted; said base flange comprising substantially semicircular segments separated by diametrically opposed notches in which said dogs are integrally joined to said base flange.

7. A basket nut assembly as defined in claim 1, wherein said housing comprises a stamped sheet metal basket having at one end a radially outwardly projecting flange constituting said means for attaching it to a work body, having at its other end a radially inwardly projecting retainer lip defining said retainer shoulder, and having a cylindrical collar portion extending between said flange and lip.

8. A basket nut assembly as defined in claim 1, wherein said housing comprises a tubular body having an internal annular groove receiving said latch arms and nut base and defining axially opposed annular shoulders, one being said retainer shoulder and the other providing a seat for said nut base, said housing adapted to be potted into a sandwich panel.

9. A basket nut assembly comprising:
a cylindrical housing having means for attaching it to a work body and having a retainer shoulder projecting inwardly and defining a release aperture;
a nut comprising an internally threaded body and a generally circular base on one end thereof received in said housing, said base including a generally circular flange projecting radially outwardly from said sleeve end and a pair of latch arms disposed in a plane adjacent to but offset axially from the plane of said flange, attached at one end to one side of said flange, extending arcuately along respective sides of said flange, projecting radially outwardly beyond the periphery thereof for at least a portion of their length, and having their other ends free for inwardly retracting movements from normal positions projecting beneath said shoulder to retain the nut in the housing, to positions in non-interfering relation to said shoulder such that said nut base can be passed through said release aperture; said retainer shoulder having a pair of diametrically-opposed notches and said base flange having a pair of diametrically opposite dogs received in said notches to hold said nut against rotation relative to said basket, and releasable through said notches when said arms are retracted.

References Cited

UNITED STATES PATENTS

| | | | |
|---|---|---|---|
| 2,144,553 | 1/1939 | Simmonds | 151—41.76 |
| 2,304,107 | 12/1942 | Leisure | 151—41.76 |
| 2,934,919 | 5/1960 | Barta et al. | 151—41.75 |
| 3,110,372 | 11/1963 | Pierce et al. | 151—41.75 |
| 3,259,165 | 7/1966 | Tobian et al. | 151—41.76 |

MARION PARSONS, JR., Primary Examiner

U.S. Cl. X.R.

85—32; 151—41.76